(12) United States Patent
Ma et al.

(10) Patent No.: US 10,675,762 B2
(45) Date of Patent: Jun. 9, 2020

(54) SYSTEMS AND METHODS FOR USING AN EXTERNAL SENSOR AND A MOBILE DEVICE TO SIMULATE REAL SENSORS FOR A ROBOT

(71) Applicant: FUJI XEROX CO., LTD., Tokyo (JP)

(72) Inventors: Shang Ma, Irvine, CA (US); Qiong Liu, Cupertino, CA (US); Patrick Chiu, Mountain View, CA (US)

(73) Assignee: FUJI XEROX CO., LTD., Tokyo (JP)

(*) Notice: Subject to any disclaimer, the term of this patent is extended or adjusted under 35 U.S.C. 154(b) by 241 days.

(21) Appl. No.: 14/975,702

(22) Filed: Dec. 18, 2015

(65) Prior Publication Data

US 2017/0173794 A1  Jun. 22, 2017

(51) Int. Cl.
*B25J 9/16* (2006.01)
*H04W 4/70* (2018.01)
*G05D 1/02* (2020.01)
*B25J 9/00* (2006.01)
*H04M 1/725* (2006.01)

(52) U.S. Cl.
CPC ........... *B25J 9/1697* (2013.01); *B25J 9/0003* (2013.01); *B25J 9/1676* (2013.01); *G05D 1/028* (2013.01); *G05D 1/0231* (2013.01); *G05D 1/0276* (2013.01); *H04M 1/72527* (2013.01); *H04W 4/70* (2018.02); *B25J 9/1694* (2013.01); *G05B 2219/36159* (2013.01); *G05B 2219/37537* (2013.01); *G05D 2201/0214* (2013.01); *Y10S 901/01* (2013.01)

(58) Field of Classification Search
CPC ...... B25J 9/1697; B25J 9/1676; B25J 9/0003; B25J 9/1694; G05D 1/028; G05D 1/0231; G05D 1/0276; H04M 1/72527; H04W 4/005; Y10S 901/01; G06F 17/50; G05B 2219/36159; G05B 2219/37537
USPC .......................................................... 703/13
See application file for complete search history.

(56) References Cited

U.S. PATENT DOCUMENTS 5,428,279 A * 6/1995 Sugimoto ................ B25J 19/06
318/445
8,718,822 B1 * 5/2014 Hickman ............... B25J 9/1674
700/214

(Continued)

OTHER PUBLICATIONS

Watanabe, Yutaka et al., "Position Estimation of Mobile Robots with Internal and External Sensors using Uncertainty Evolution Technique", 1990, IEEE.*

(Continued)

*Primary Examiner* — Cedric Johnson
(74) *Attorney, Agent, or Firm* — Procopio, Cory, Hargreaves & Savitch LLP

(57) ABSTRACT

A computer-implemented system and method for using certain simulated sensors constructed with an accurate localization sensor and a mobile phone to replace/enhance many existing real-life sensors. By using "simulated sensor" to convert localization sensor measurement to real signal outputs that are similar to real distance-sensor outputs, real direction sensor outputs, or real line following sensor outputs, one or more embodiments of the invention may be used to upgrade traditional robots by plugging these simulated outputs to robots' corresponding sensor inputs without the need to rewire or add customized hardware.

17 Claims, 5 Drawing Sheets

(56) References Cited

U.S. PATENT DOCUMENTS

| | | | | |
|---|---|---|---|---|
| 2009/0326713 | A1* | 12/2009 | Moriya | A63H 17/00 |
| | | | | 700/255 |
| 2011/0184558 | A1* | 7/2011 | Jacob | B25J 9/1676 |
| | | | | 700/259 |
| 2011/0231016 | A1* | 9/2011 | Goulding | G06N 3/008 |
| | | | | 700/246 |
| 2011/0288684 | A1* | 11/2011 | Farlow | B25J 11/009 |
| | | | | 700/264 |
| 2012/0101679 | A1* | 4/2012 | Anderson | B25J 9/1671 |
| | | | | 701/23 |
| 2013/0192183 | A1* | 8/2013 | Choi | A01D 34/008 |
| | | | | 56/10.2 A |
| 2014/0180478 | A1* | 6/2014 | Letsky | E01H 5/098 |
| | | | | 700/258 |
| 2014/0228701 | A1* | 8/2014 | Chizeck | A61B 5/04012 |
| | | | | 600/544 |
| 2015/0336276 | A1* | 11/2015 | Song | B25J 11/001 |
| | | | | 700/253 |

OTHER PUBLICATIONS

Alajlan, Abrar M. et al., "Multi-Sensor Based Collision Avoidance Algorithm for Mobile Robot", Jul. 16, 2015, IEEE.*
http://www.nxtprograms.com/line_follower/steps.html visited on Mar. 30, 2016.
https://www.sparkfun.com/products/11769 on Mar. 30, 2016.
https://www.adafruit.com/products/1715 on Mar. 30, 2016.
http://letsmakerobots.com/robot/project/rero-robot-kit-the-review-second-part-ultrasonic-obstacle-avoidance-4-wheel-car on Mar. 30, 2016.

* cited by examiner

SYSTEMS AND METHODS FOR USING AN EXTERNAL SENSOR AND A MOBILE DEVICE TO SIMULATE REAL SENSORS FOR A ROBOT

BACKGROUND OF THE INVENTION

Technical Field

The disclosed embodiments relate in general to the field of robotics and, more specifically, to systems and methods for using an external sensor, such as an accurate location sensor, and a mobile device to simulate real sensors for a robot.

Description of the Related Art

Adding new fancy functions such security fencing or dynamic navigation map to a released robot in a traditional way is not an easy task. Normally, robot owners need to ship robots back to manufactures for installing new sensors, adding new hardware and software interfaces for defining a map or security fencing and reprogramming the core control units with new algorithms for new hardware and the corresponding new functions. The above-described required steps make the overall robot upgrade process very expensive and time-consuming.

On the other hand, robots may need many different sensors to help their navigation. It may need line detection sensors to tell if the robot is on the left or right of a line so that the robot can follow a predefined line. It may need a distance sensor to tell the robot how close it is to existing obstacles for collision avoidance. It may also need direction sensors to tell the robot how to turn its direction accurately for some tasks such shooting a photo or a video.

Therefore, there is a need for new systems and methods that would provide new sensing functionality to existing robots in an inexpensive, simple and effective manner.

SUMMARY OF THE INVENTION

The embodiments described herein are directed to methods and systems that substantially obviate one or more of the above and other problems associated with conventional technology for robot upgrade.

In accordance with one aspect of the inventive concepts described herein, there is provided a computer-implemented method for generating a simulated sensor signal for a robot comprising a plurality of robot sensors, the computer-implemented method involving: receiving a sensor signal from an external sensor, the external sensor being separate and distinct from the robot; using a processing unit and a memory, the processing unit and the memory being separate and distinct from the robot, to calculate a simulated signal of one of the plurality of robot sensors based on the received sensor signal; generating the simulated signal of the one of the plurality of robot sensors based on the calculation; and transmitting the generated simulated robot sensor signal to the robot.

In one or more embodiments, the external sensor is a location sensor and wherein the received external sensor signal is a location signal.

In one or more embodiments, the one of the plurality of robot sensors is an obstacle distance sensor.

In one or more embodiments, the simulated signal of the one of the plurality of robot sensors is calculated based, at least in part, on known location of one or more objects.

In one or more embodiments, the method further comprises conditioning the generated simulated robot sensor signal using a signal conditioning circuit.

In one or more embodiments, conditioning comprises rectifying the generated simulated robot sensor signal.

In one or more embodiments, conditioning comprises amplifying the generated simulated robot sensor signal to match parameters of corresponding robot sensor.

In one or more embodiments, the external sensor is a light sensor configured to detect a position-encoded light signal and wherein the processing unit and a memory are configured to decode location information from the detected position-encoded light signal.

In one or more embodiments, the external sensor is an acceleration sensor.

In one or more embodiments, the external sensor is an orientation sensor.

In one or more embodiments, the external sensor is a sound sensor.

In one or more embodiments, the generated simulated robot sensor signal is a voltage signal.

In one or more embodiments, the generated simulated robot sensor signal is a timing signal.

In accordance with another aspect of the inventive concepts described herein, there is provided a computerized system for generating a simulated sensor signal for a robot comprising a plurality of robot sensors, the system incorporating: an external sensor for providing an external sensor signal, the external sensor being separate and distinct from the robot; a processing unit and a memory, the processing unit and the memory being separate and distinct from the robot, for calculating a simulated signal of one of the plurality of robot sensors based on the external sensor signal; and an output interface for generating the simulated signal of the one of the plurality of robot sensors based on the calculation and for transmitting the generated simulated robot sensor signal to the robot.

In one or more embodiments, the output interface comprises an audio interface jack.

In one or more embodiments, the external sensor is a location sensor and wherein the external sensor signal is a location signal.

In one or more embodiments, the simulated signal of the one of the plurality of robot sensors is calculated based, at least in part, on known location of one or more objects.

In one or more embodiments, the system further comprises a signal conditioning circuit for conditioning the generated simulated robot sensor signal.

In one or more embodiments, the signal conditioning circuit comprises a filtering stage for rectifying the generated simulated robot sensor signal.

In one or more embodiments, the signal conditioning circuit comprises an amplification stage for amplifying the generated simulated robot sensor signal to match parameters of corresponding robot sensor.

In accordance with yet another aspect of the inventive concepts described herein, there is provided a non-transitory computer-readable medium embodying a set of computer-executable instructions, which, when executed in a computerized system comprising a processing unit and a memory, cause the computerized system to perform a method for generating a simulated sensor signal for a robot comprising a plurality of robot sensors, the method involving: receiving a sensor signal from an external sensor, the external sensor being separate and distinct from the robot; using the processing unit and the memory, the processing unit and the memory being separate and distinct from the robot, to calculate a simulated signal of one of the plurality of robot sensors based on the received sensor signal; generating the simulated signal of the one of the plurality of robot sensors based on the calculation; and transmitting the generated simulated robot sensor signal to the robot.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

Figure 1:
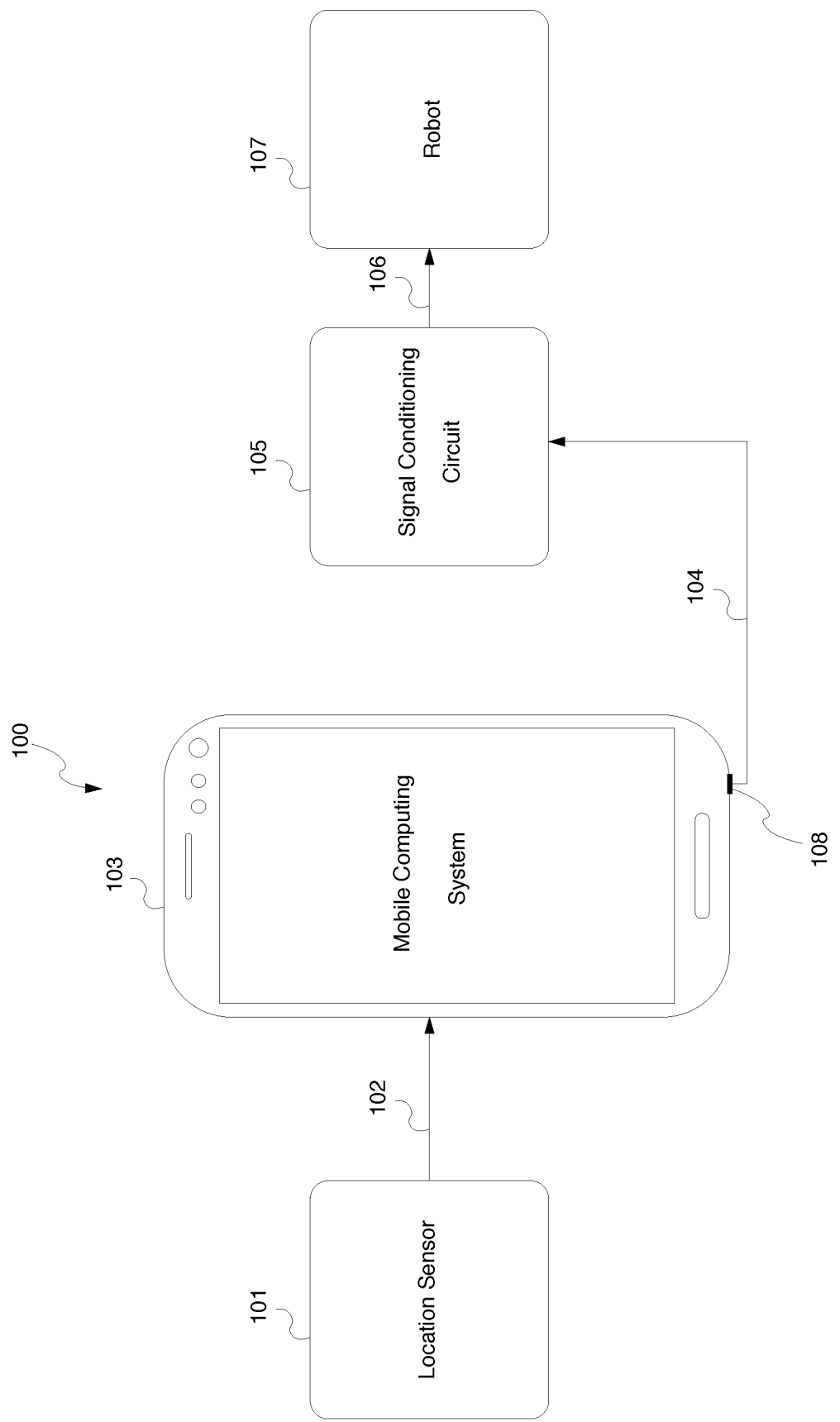
FIG. 1 illustrates an exemplary embodiment of a system for simulating various sensor signals for a robot.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a system and method for introducing accurate sensors, such as localization sensors, to existing robots without changing their core control units or wiring new sensors to core control units. The described system and method also facilitate adding some new functions to existing robots with software upgrade easily performed on a mobile phone.

One or more embodiments described herein utilize certain simulated sensors constructed with an accurate localization sensor and a mobile phone to replace/enhance many existing real-life sensors. By using "simulated sensor" to convert localization sensor measurement to real signal outputs that are similar to real distance-sensor outputs, real direction sensor outputs, or real line following sensor outputs, one or more embodiments of the invention may be used to upgrade traditional robots by plugging these simulated outputs to robots' corresponding sensor inputs without the need to rewire or add customized hardware.

In one example, Sparki, which is a commercially available car-like robot, very popular in the robotics community, is equipped with five infrared line-following sensors. In another example, Rero robot, which is also widely available commercially, has an HC-SR04 ultrasonic sensor for object detection and obstacle avoidance. However, the infrared sensors disposed on the aforesaid Sparki robot are very sensitive to the color of reflective objects. This is because the output of the aforesaid infrared sensors is based on the measurements of the reflected infrared beam. And it is quite possible for both direct and indirect sunlight to significantly affect the measurements produced by the aforesaid infrared sensors. Moreover, infrared distance sensors have a non-linear output. This means that as the distance increases linearly, the analog output increases or decreases non-linearly. Although the ultrasonic distance sensor on the aforesaid Rero robot is not affected by sunlight or black material, acoustically soft materials like cloth and foam, tend to absorb sound energy and can be hard to detect at long range. Additionally, ultrasonic sensors usually require a minimum target surface area to receive ample sound echo for reliable sensing. They also require time for the sensor to stop ringing after each transmission burst before they are ready to receive returned echoes. As a result, the response frequency is typically lower than other technologies at about 10 Hz.

As would be appreciated by persons of ordinary skill in the art, the aforesaid substantial drawbacks of the conventional hardware sensors make accurate navigation for these two exemplary robots (Sparki and Rero) difficult. Therefore, in accordance with one embodiment, to achieve more reliable line following and collision detection, special software is used to mimic line following sensor error output signal, and obstacle distance sensor signal.

As it is well known in the art, the output of the infrared sensors on the aforesaid Sparki robot is a voltage signal that is indicative of the distance between the robot and the object in front of it. This output voltage signal is inversely proportional to this distance and usually in the range of between 0 and 5 volts. The output of the ultrasonic distance sensor on the aforesaid Rero robot is different. When the sensor detects ultrasonic reflection from the object ahead, it will set a specific pin of the sensor to high, which is usually 5 Volt, and delay for a period which is proportional to the distance between the sensor and the object. As would be appreciated by persons of ordinary skill in the art, both of the amplitude and the duration that are being used in these two robots for line following and collision detection can be simulated by generating audio signal through the mobile phone's audio jack with corresponding amplitude or duration.

An exemplary embodiment of a system 100 for simulating various sensor signals for a robot is illustrated in FIG. 1. In that figure, a location sensor 101 provides location information 102 to a mobile computing system 103, such as a smartphone phone, a tablet computer, a microcontroller board including, without limitation, Arduino or Raspberry Pi, which are available commercially and well known in the art, or any other type of computing system. In one or more embodiments, the location sensor 101 has high location detection resolution and/or low location detection latency (high frame rate). In various embodiments, the location information 102 may be provided to the mobile computing system 103 using a variety of means, including, without limitation, electrical signal carried through wired connection, electromagnetic radio-frequency (RF) signal, or light signal. In one embodiment, the location sensor 101 comprises a light sensor, which obtains the location information using coded lighting as described, for example, in U.S. patent application Ser. No. 14/164,293, incorporated herein by reference. In one exemplary embodiment, the location sensor 101 is a luminance sensor of a smartphone.

After receiving the location information 102, the mobile computing system 103 uses it, in conjunction with software installed therein, to simulate one or more sensor signals to be provided to the robot 107. In one or more embodiments, the software for generating simulated sensor signals installed on the mobile computing system 103 may be implemented in a form of a mobile software application, such as iOS or Android application, well known to persons of ordinary skill in the art. The type(s) of simulated sensor signals depend on the type of robot being used. In various embodiments, the simulated sensor signal(s) 104 may be analog signals or digital signals. For example, one type of generated simulated signal would be a voltage signal, wherein the voltage generated by the mobile computing system 103 operating in conjunction with the iOS or Android application would be indicative of the sensed parameter, such as distance. In another example, the generated simulated signal may be a timing signal, wherein the duration or delay of the simulated signal is indicative of the sensed parameter. As would be appreciated by persons of ordinary skill in the art, many other types of simulated sensor signals or arbitrary forms may be generated by the mobile computing system 103 operating in conjunction with the iOS or Android application to suit a particular robot sensor type and, therefore, the invention described herein is not limited to any specific type of the simulated sensor signal. In one embodiment, the generated simulated sensor signal 104 is output using an audio output jack 108 of the mobile computing system 103.

In one or more embodiments, the simulated sensor signal(s) 104 is/are sent by the mobile computing system 103 to the robot 107 through one or more signal conditioning circuits 105, which are configured to produce a conditioned simulated sensor signal 106. The signal conditioning circuits 105 may be configured to amplify and/or filter the simulated signal 104 generated by the mobile computing system 103. As would be appreciated by persons of ordinary skill in the art, the signal conditioning circuits 105 may perform any type of signal processing on the received simulated sensor signal(s) 104 and, therefore, the invention described herein is not limited to any specific type of signal processing by the signal conditioning circuits 105.

Figure 2:
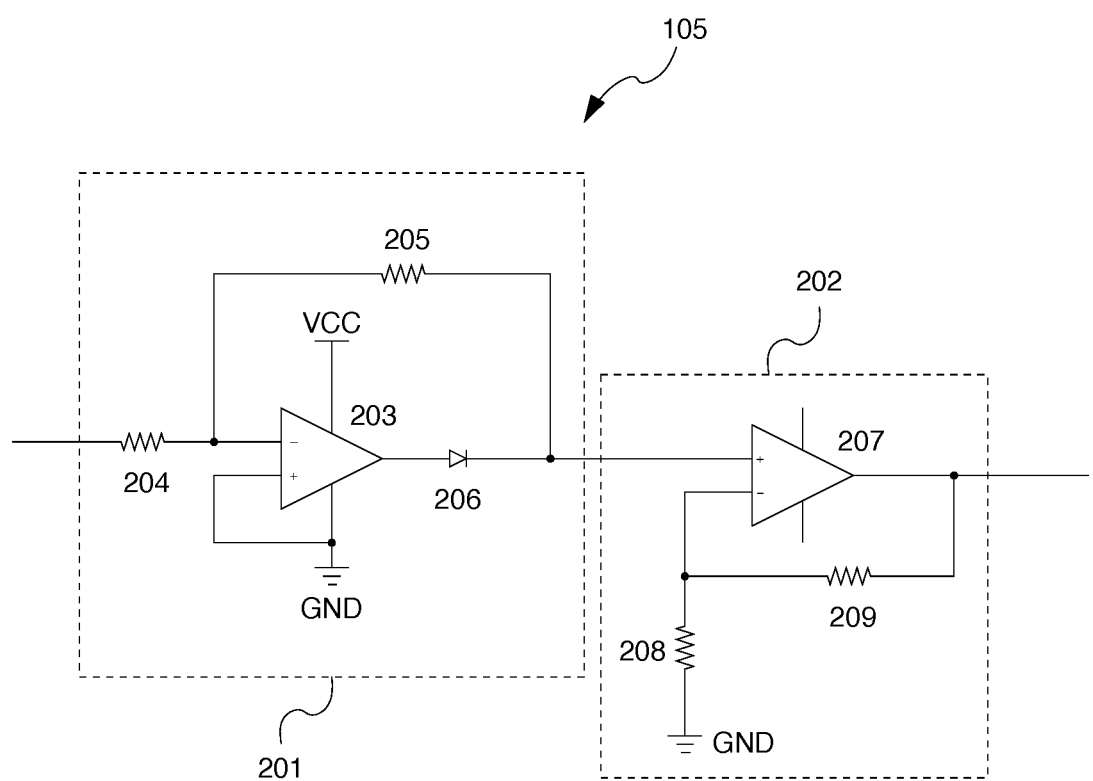
FIG. 2 illustrates an exemplary embodiment of a signal conditioning circuit.

An exemplary embodiment of a signal conditioning circuit 105 is illustrated in FIG. 2. The shown exemplary signal conditioning circuit 105 incorporates two signal-processing stages: signal filtering stage 201 and signal amplifying stage 202. The signal filtering stage 201 operates as a closed-loop signal inverter for negative signals and allows positive signals to pass through without inversion. The signal filtering stage 201 incorporates an operational amplifier 203, resistors 204 and 205 and rectifier diode 206 interconnected in the conventional manner illustrated in FIG. 2.

On the other hand, the signal amplifying stage 202 incorporates an operational amplifier 207 and resistors 208 and 209. The values of the resistance of the resistors 208 and 209 are calculated to achieve the desired level of amplification of the circuit to meet the expected output voltage range of the corresponding robot sensor in accordance with conventional techniques well known in the art. The resulting output signal 106 of the signal conditioning circuit 105 illustrated in FIG. 2 is an amplified full-wave rectified waveform, which is provided to the robot 107. In various exemplary embodiments, the resulting output signal 106 may be used to navigate the robot 107 to follow a line or avoid obstacles. As would be appreciated by persons of ordinary skill in the art, the invention described herein is not limited to any specific type of simulated sensor and output of any type of sensor type may be generated using the techniques described herein.

As would be appreciated by persons of ordinary skill in the art, in accordance with the described techniques, a single fast and accurate localization sensor and a smartphone may be used to simulate many different sensors at the same time. For example, if one knows the position of a virtual fence, one can measure the distance between the robot and the virtual fence, and transform this measurement to an obstacle distance simulated sensor signal. Moreover, if the localization sensor can reach a high framerate (low location detection latency), one can use one location sensor as multiple location sensors to obtain the pose information of multiple robots when they are moving. Depending on the sampling speed and location accuracy, this pose detection can be very accurate. This function cannot be achieved with traditional low resolution and low sampling rate localization system because the resolution or distance moved within each sampling interval is much larger than the robot itself.

In one or more embodiments, the techniques described herein are used to add robot fencing and dynamic map changing functions to the mobile computing system 103, such as a smartphone, without changing hardware/software of many existing robots.

Figure 3:
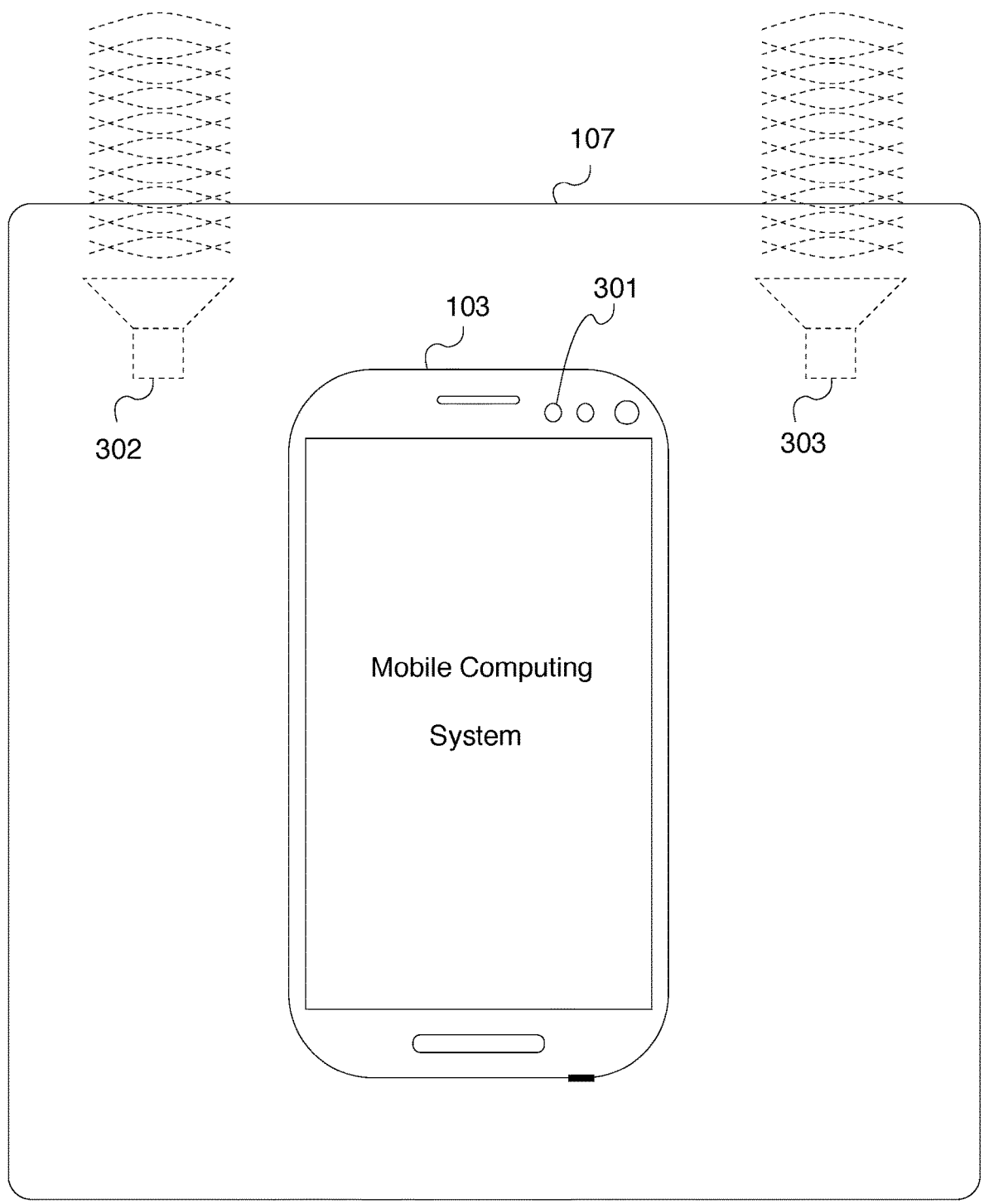
FIG. 3 illustrates an exemplary embodiment of a system for simulating distance sensor output signals for a robot, employing coded lighting for robot location determination.

FIG. 3 illustrates an exemplary embodiment of a system for simulating distance sensor output signals for a robot, employing coded lighting for robot location determination. As illustrated in that figure, a smartphone or other mobile computing device 103 incorporating a light sensor 301 is mounted on a robot 107. The smartphone 103 is configured to use its light sensor 301 to detect coded lighting and extract position information therefrom. This position information is then used by the software application running on the smartphone 103 to calculate distance values from the robot 107 to the nearest known obstacle(s) in robot's path and simulate the corresponding real-life signal from virtual distance sensors 302 and 303 using audio output of the smartphone 103. For this purpose, the smartphone 103 may be configured to store or remotely access location data of the known obstacles.

In various embodiments, the sensor providing information to the mobile computing system 103 may be, without limitation, a location sensor, an orientation sensor, an acceleration sensor, a lighting sensor and/or a sound sensor. As would be appreciated by persons of ordinary skill in the art, the invention described herein is not limited to any specific type of sensor providing data to the mobile computing system 103 and any sensor type may be employed using the techniques described herein.

Figure 4:
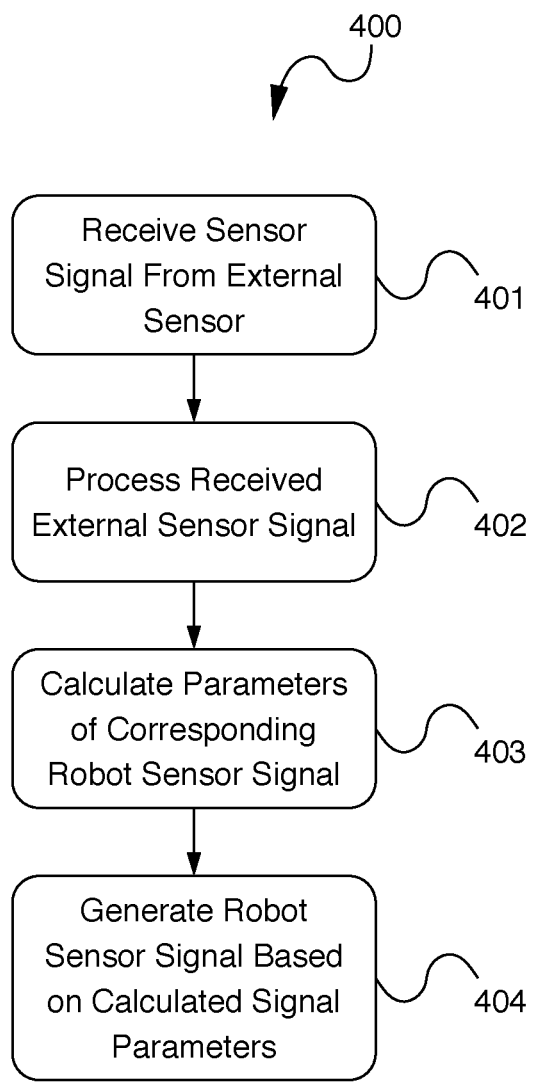
FIG. 4 illustrates an exemplary operating sequence of the software application executing on the mobile computing system.

FIG. 4 illustrates an exemplary operating sequence 400 of the software application executing on the mobile computing system 103. At step 401, sensor signal from one or more of the external sensors is received by the mobile computing system 103. The received information may be, without limitation, a location information, orientation information, acceleration information, lighting information and sound information. At step 402, the mobile computing system 103 processes the received sensor signal. For example, during this step, the current robot location may be decoded from the coded light signal detected using a light sensor. At step 403, the software application executing on the mobile computing system 103 uses the processed external sensor information as well as (optionally) stored information to calculate the parameters of one or more real-life sensor signals corresponding to the received external sensor information. The exemplary calculated parameters may include voltage parameters (e.g. voltage value), timing parameters (signal pulse delay or duration) or any other types of signal parameters (e.g. voltage increase or decay characteristics). In one example, the mobile computing system 103 may receive position-encoded lighting information from a lighting sensor. The software application then performs decoding of the position of the robot and calculates distance between the decoded robot position and the nearest obstacle in robot's path. To this end, the software application may access a list of locations of known obstacles stored in a database. After that, a corresponding simulated distance sensor output signal may be calculated based on calculated distance. Finally, at step 404, the software application executing on the mobile computing system 103 uses the output audio jack of the mobile computing system 103 to output the resulting calculated sensor signal.

Exemplary Computer Platform

Figure 5:
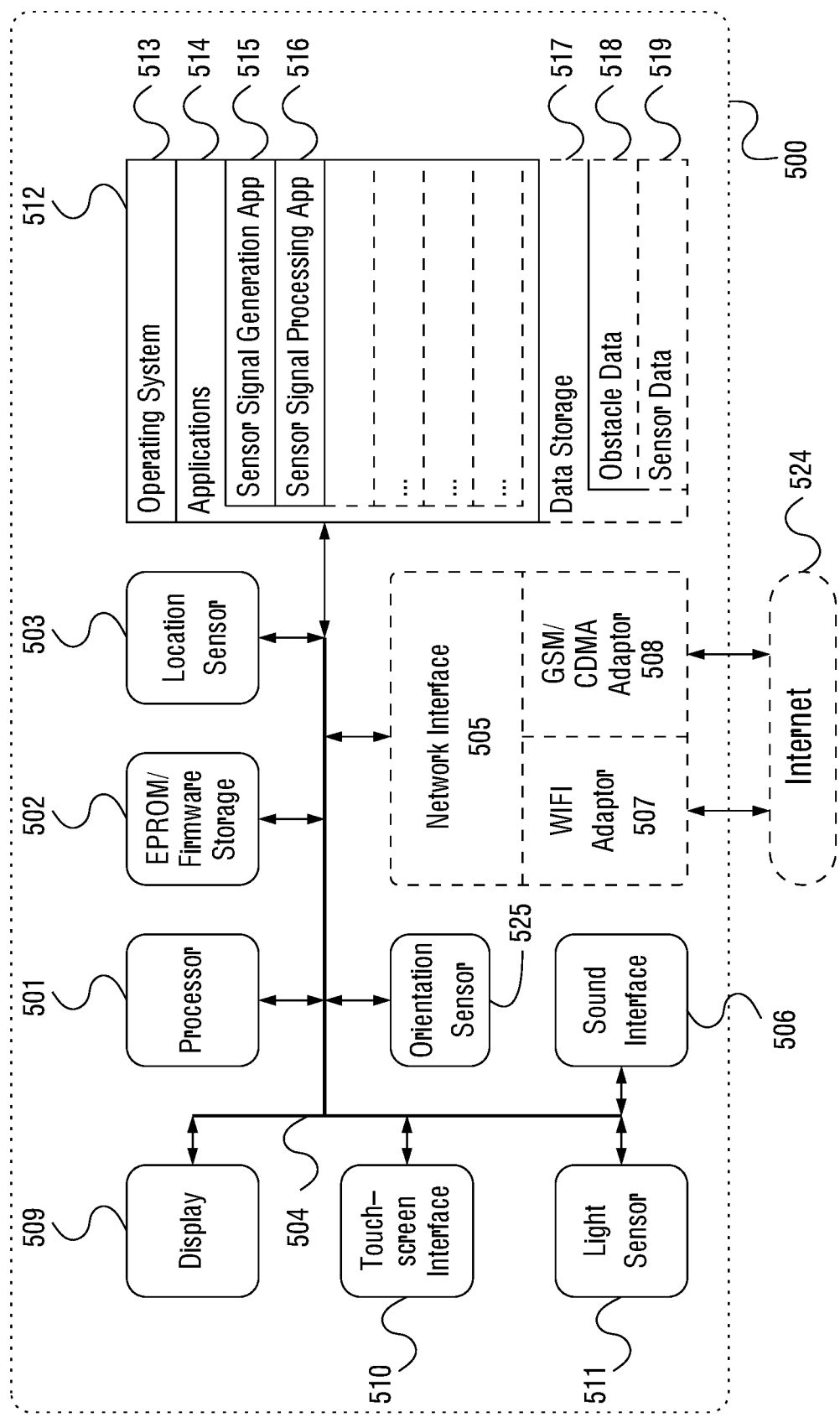
FIG. 5 illustrates an exemplary embodiment of a computerized system that could be used as the mobile computing system shown in FIG. 1.

FIG. 5 illustrates an exemplary embodiment of a computerized system 500 that could be used as the mobile computing system 103 shown in FIG. 1. In one or more embodiments, the computerized system 500 may be implemented within a form factor of a mobile computing device, such as a smartphone, a personal digital assistant (PDA), a tablet computer, or a smart watch. In an alternative embodiment, the computerized system 500 may be implemented based on a laptop, a notebook or a desktop computer. In yet alternative embodiments, the computerized system 500 may be implemented based on microcontroller boards including, without limitation, Arduino, Raspberry Pi and the like.

The computerized system 500 may include a data bus 504 or other interconnect or communication mechanism for communicating information across and among various hardware components of the computerized system 500, and a central processing unit (CPU or simply processor) 501 coupled with the data bus 504 for processing information and performing other computational and control tasks. Computerized system 500 also includes a memory 512, such as a random access memory (RAM) or other dynamic storage device, coupled to the data bus 504 for storing various information as well as instructions to be executed by the processor 501. The memory 512 may also include persistent storage devices, such as a magnetic disk, optical disk, solid-state flash memory device or other non-volatile solid-state storage devices.

In one or more embodiments, the memory 512 may also be used for storing temporary variables or other intermediate information during execution of instructions by the processor 501. Optionally, computerized system 500 may further include a read only memory (ROM or EPROM) 502 or other static storage device coupled to the data bus 504 for storing static information and instructions for the processor 501, such as firmware necessary for the operation of the computerized system 500, basic input-output system (BIOS), as well as various configuration parameters of the computerized system 500.

In one or more embodiments, the computerized system 500 may incorporate a display device 509, which may be also coupled to the data bus 504, for displaying various information to a user of the computerized system 500. In an alternative embodiment, the display device 509 may be associated with a graphics controller and/or graphics processor (not shown). The display device 509 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 509 may be incorporated into the same general enclosure with the remaining components of the computerized system 500. In an alternative embodiment, the display device 509 may be positioned outside of such enclosure.

In one or more embodiments, the computerized system 500 may incorporate one or more input devices, such as a touchscreen interface 510, which may be coupled to the aforesaid data bus 504 for communicating information as well as user command selections to the processor 501.

In one or more embodiments, the computerized system 500 may additionally include a location signal receiver 503 configured to perform scan for GPS signal(s), determine the geographical location of the computerized system 500 based on the detected GPS signal(s) and communicate the determined geographical location information to the processor 501 via the data bus 504. In addition, the computerized system 500 may incorporate orientation and/or acceleration sensors 525, which are well known in the art, for providing orientation and acceleration data to the processor 501 via the data bus 504. The location, orientation and/or acceleration data may be used for generating simulated sensor signals as described hereinabove. In addition, the computerized system 500 may incorporate a sound interface 506 for generating the simulated sensor signals as described in detail above as well as light sensor 511 for detecting light encoded with position information.

In one or more embodiments, the computerized system 500 may additionally include a communication interface, such as a network interface 505 coupled to the data bus 504. The network interface 505 may be configured to establish a connection between the computerized system 500 and the Internet 524 using at least one of WIFI interface 507 and the cellular network (GSM or CDMA) adaptor 508. The network interface 505 may be configured to provide a two-way data communication between the computerized system 500 and the Internet 524. The WIFI interface 507 may operate in compliance with 802.11a, 802.11b, 802.11g and/or 802.11n protocols as well as Bluetooth protocol well known to persons of ordinary skill in the art. In an exemplary implementation, the WIFI interface 507 and the cellular network (GSM or CDMA) adaptor 508 send and receive electrical or electromagnetic signals that carry digital data streams representing various types of information.

In one or more embodiments, the Internet 524 typically provides data communication through one or more subnetworks to other network resources. Thus, the computerized system 500 is capable of accessing a variety of network resources located anywhere on the Internet 524, such as web servers, other content servers as well as other network data storage resources. In one or more embodiments, the computerized system 500 is configured to send and receive messages, media and other data, including application program code, through a variety of network(s) including Internet 524 by means of the network interface 505. In the Internet example, when the computerized system 500 acts as a network client, it may request code or data for an application program executing on the computerized system 500. Similarly, it may act as a network server and send various data or computer code to other network resources.

In one or more embodiments, the functionality described herein is implemented by computerized system 500 in response to processor 501 executing one or more sequences of one or more instructions contained in the memory 512. Such instructions may be read into the memory 512 from another computer-readable medium. Execution of the sequences of instructions contained in the memory 512 causes the processor 501 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and/or software.

The term "computer-readable medium" as used herein refers to any medium that participates in providing instructions to processor 501 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 501 for execution. For example, the instructions may initially be carried on a magnetic disk from a remote computer. Alternatively, a remote computer can load the instructions into its dynamic memory and send the instructions over the Internet 524. Specifically, the computer instructions may be downloaded into the memory 512 of the computerized system 500 from the foresaid remote computer via the Internet 524 using a variety of network data communication protocols well known in the art.

In one or more embodiments, the memory 512 of the computerized system 500 may store any of the following software programs, applications or modules:

1. Operating system (OS) 513, which may be a mobile operating system for implementing basic system services and managing various hardware components of the computerized system 500. Exemplary embodiments of the operating system 513 are well known to persons of skill in the art, and may include Mac OS, iOS, Android, Windows, Windows Mobile, Linux, Unix or any other now known or later developed operating system(s).

2. Applications 514 may include, for example, a set of software applications executed by the processor 501 of the computerized system 500, which cause the computerized system 500 to perform certain predetermined functions, such as generating the simulated sensor signals as described above. In one or more embodiments, the applications 514 may include, for example, the simulated sensor signal generating application 515 as well as signal processing application 516 for external sensors.

3. Data storage 517 may be used, for example, for storing various auxiliary information, such as, for example, geographical locations of known obstacles 518 and/or desired output parameters for the simulated sensor types 519. Other relevant information may also be stored in the Data storage 516.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for using an external sensor and a mobile device to simulate real sensors for a robot. It is intended that the specification and examples be considered as exemplary only, with a true scope and spirit of the invention being indicated by the following claims.

What is claimed is:

1. A computer-implemented method for generating a sensor signal for a robot comprising a plurality of robot sensors, the computer-implemented method comprising:
    a. receiving a sensor signal of a first type from an external sensor, the external sensor disposed on a computing device that is separate and distinct from the robot;
    b. using a processing unit and a memory of the computing device to calculate parameters for a simulated sensor signal based on the received sensor signal, the parameters for the simulated sensor signal corresponding to a robot sensor signal of a second type generated by one of the plurality of robot sensors, the second type being distinct from the first type;
    c. generating the simulated sensor signal based on the calculation by the computing device;
    d. conditioning the generated simulated sensor signal using a signal conditioning circuit, in part, by amplifying the parameters of the generated simulated sensor signal to match parameters of the robot sensor signal of the one of the plurality of robot sensors; and
    e. transmitting the conditioned simulated sensor signal to the robot from the computing device.

2. The computer-implemented method of claim 1, wherein the external sensor is a location sensor and wherein the received external sensor signal is a location signal.

3. The computer-implemented method of claim 1, wherein the one of the plurality of robot sensors is an obstacle distance sensor.

4. The computer-implemented method of claim 1, wherein the parameters for the simulated sensor signal is calculated based, at least in part, on known location of one or more objects.

5. The computer-implemented method of claim 1, wherein conditioning comprises rectifying the generated simulated sensor signal.

6. The computer-implemented method of claim 1, wherein the external sensor is a light sensor configured to detect a position-encoded light signal and wherein the processing unit and a memory are configured to decode location information from the detected position-encoded light signal.

7. The computer-implemented method of claim 1, wherein the external sensor is an acceleration sensor.

8. The computer-implemented method of claim 1, wherein the external sensor is an orientation sensor.

9. The computer-implemented method of claim 1, wherein the external sensor is a sound sensor.

10. The computer-implemented method of claim 1, wherein the generated simulated sensor signal is a voltage signal.

11. The computer-implemented method of claim 1, wherein the generated simulated sensor signal is a timing signal.

12. A computerized system for generating a sensor signal for a robot comprising a plurality of robot sensors, the system comprising:
   a. an external sensor for providing an external sensor signal of a first type, the computerized system being separate and distinct from the robot;
   b. a processing unit and a memory for calculating a parameters for a simulated sensor signal based on the received sensor signal, the parameters for the simulated sensor signal corresponding to a robot sensor signal of a second type generated by one of the plurality of robot sensors, the second type being distinct from the first type;
   c. a signal conditioning circuit for conditioning the generated simulated sensor signal, the signal condition circuit comprising an amplification stage for amplifying the parameters of the generated simulated sensor signal to match parameters of the robot sensor signal of the one of the plurality of robot sensors; and
   d. an output interface for generating the simulated sensor signal based on the calculation and for transmitting the generated simulated sensor signal to the robot.

13. The computerized system of claim 12, wherein the output interface comprises an audio interface jack.

14. The computerized system of claim 12, wherein the external sensor is a location sensor and wherein the external sensor signal is a location signal.

15. The computerized system of claim 12, wherein the parameters for the simulated sensor signal is calculated based, at least in part, on known location of one or more objects.

16. The computerized system of claim 12, wherein the signal conditioning circuit comprises a filtering stage for rectifying the generated simulated sensor signal.

17. A non-transitory computer-readable medium embodying a set of computer-executable instructions, which, when executed in a computerized system
   a. comprising a processing unit and a memory, cause the computerized system to perform a method for generating a simulated sensor signal for a robot comprising a plurality of robot sensors, the method comprising:
   b. receiving a sensor signal of a first type from an external sensor, the computerized system being separate and distinct from the robot;
   c. using the processing unit and the memory to calculate a parameters for a simulated sensor signal based on the received sensor signal, the parameters for the simulated sensor signal corresponding to a robot sensor signal of a second type generated by one of the plurality of robot sensors, the second type being distinct from the first type;
   d. generating the simulated sensor signal based on the calculation;
   e. conditioning the generated simulated sensor signal using a signal conditioning circuit, in part, by amplifying the parameters of the generated simulated sensor signal to match parameters of the robot sensor signal of the one of the plurality of robot sensors; and
   f. transmitting the generated simulated sensor signal to the robot.

* * * * *